(12) United States Patent
Uneura et al.

(10) Patent No.: US 10,443,439 B2
(45) Date of Patent: Oct. 15, 2019

(54) BEARING STRUCTURE AND TURBOCHARGER

(71) Applicant: IHI CORPORATION, Koto-ku (JP)

(72) Inventors: Yutaka Uneura, Tokyo (JP); Shinichi Kaneda, Tokyo (JP); Yuichi Daito, Tokyo (JP); Hideyuki Kojima, Tokyo (JP); Tomomi Sugiura, Tokyo (JP)

(73) Assignee: IHI CORPORATION, Koto-ku (JP)

( * ) Notice: Subject to any disclaimer, the term of this patent is extended or adjusted under 35 U.S.C. 154(b) by 412 days.

(21) Appl. No.: 15/335,940

(22) Filed: Oct. 27, 2016

(65) Prior Publication Data

US 2017/0044933 A1 Feb. 16, 2017

Related U.S. Application Data

(63) Continuation of application No. PCT/JP2015/068493, filed on Jun. 26, 2015.

(30) Foreign Application Priority Data

Jul. 9, 2014 (JP) .................................. 2014-141173

(51) Int. Cl.
*F01D 25/16* (2006.01)
*F16C 17/18* (2006.01)
(Continued)

(52) U.S. Cl.
CPC ............. *F01D 25/162* (2013.01); *F01D 5/04* (2013.01); *F01D 25/164* (2013.01);
(Continued)

(58) Field of Classification Search
CPC ...... F16C 17/02; F16C 35/02; F16C 2360/24; F16C 27/02; F16C 33/10; F01D 25/16;
(Continued)

(56) References Cited

U.S. PATENT DOCUMENTS

| 5,246,352 A | 9/1993 | Kawakami |
| 9,528,389 B2 * | 12/2016 | Koerner ................. F16C 35/02 |

(Continued)

FOREIGN PATENT DOCUMENTS

| CN | 103080499 A | 5/2013 |
| JP | 50-84646 | 7/1975 |

(Continued)

OTHER PUBLICATIONS

Combined Chinese Office Action dated Mar. 29, 2018 in Patent Application No. 201580023532.X (with English translation of categories of cited documents).

(Continued)

*Primary Examiner* — Alan B Waits
(74) *Attorney, Agent, or Firm* — Oblon, McClelland, Maier & Neustadt, L.L.P.

(57) ABSTRACT

A bearing structure includes a through-hole penetrating through in the axial direction of shaft, a bearing holder accommodated in the through-hole, a semi-floating metal bearing accommodated in the bearing holder and supporting the shaft inserted into the inside, and a positioning member being inserted into a radial direction of the shaft for both the bearing holder and the semi-floating metal bearing and regulating movement of the semi-floating metal bearing in the axial direction and in a rotating direction of the shaft relative to the bearing holder. For the bearing holder, a press-fit portion to be press-fitted into the through-hole is formed. A gap is formed between at least one of outer circumferential surfaces of both end parts of the bearing holder in the axial direction and the inner circumferential surface of the through-hole.

11 Claims, 3 Drawing Sheets

(51) Int. Cl.
| | |
|---|---|
| *F04D 29/05* | (2006.01) |
| *F16C 27/02* | (2006.01) |
| *F01D 5/04* | (2006.01) |
| *F04D 29/053* | (2006.01) |
| *F04D 29/056* | (2006.01) |
| *F04D 29/063* | (2006.01) |
| *F04D 29/28* | (2006.01) |
| *F04D 29/057* | (2006.01) |
| *F16C 17/02* | (2006.01) |
| *F16C 33/10* | (2006.01) |
| *F01D 25/18* | (2006.01) |

(52) U.S. Cl.
CPC ......... *F04D 29/053* (2013.01); *F04D 29/056* (2013.01); *F04D 29/057* (2013.01); *F04D 29/0563* (2013.01); *F04D 29/063* (2013.01); *F04D 29/284* (2013.01); *F16C 17/18* (2013.01); *F16C 27/02* (2013.01); *F01D 25/18* (2013.01); *F05D 2220/40* (2013.01); *F05D 2240/60* (2013.01); *F05D 2300/10* (2013.01); *F16C 17/02* (2013.01); *F16C 33/10* (2013.01); *F16C 2360/24* (2013.01)

(58) Field of Classification Search
CPC ...... F01D 25/166; F01D 25/18; F01D 25/186; F01D 25/162; F01D 5/04; F02C 6/12; F05D 2220/40; F04D 29/053; F04D 29/056; F04D 29/0563; F04D 29/057; F04D 29/063; F04D 29/284
See application file for complete search history.

(56) References Cited

U.S. PATENT DOCUMENTS

| | | | |
|---|---|---|---|
| 2011/0038717 A1 | 2/2011 | Lee et al. | |
| 2013/0236336 A1 | 9/2013 | Koerner et al. | |
| 2014/0127051 A1 | 5/2014 | Takahashi et al. | |
| 2015/0078884 A1* | 3/2015 | Uneura ............... | F16C 33/1065 415/104 |
| 2016/0348577 A1* | 12/2016 | Uneura ................... | F01D 25/20 |
| 2016/0348719 A1* | 12/2016 | Uneura ................... | F16C 27/02 |

FOREIGN PATENT DOCUMENTS

| | | |
|---|---|---|
| JP | 5-79345 | 3/1993 |
| JP | 7-139363 A | 5/1995 |
| JP | 2007-170296 A | 7/2007 |
| JP | 2009-270613 | 11/2009 |
| JP | 2010-138757 | 6/2010 |
| JP | 2011-236966 | 11/2011 |
| JP | 2013-2312 | 1/2013 |
| JP | 2013-19323 | 1/2013 |
| JP | 2013-155668 | 8/2013 |
| JP | 2013-541676 | 11/2013 |

OTHER PUBLICATIONS

International Search Report dated Sep. 29, 2015 in PCT/JP2015/068493, filed on Jun. 26, 2015 (with English Translation).
Written Opinion dated Sep. 29, 2015 in PCT/JP2015/068493, filed on Jun. 26, 2015.
Office Action dated Apr. 24, 2018 in Japanese Patent Application No. 2017-169272.

* cited by examiner

BEARING STRUCTURE AND TURBOCHARGER

CROSS REFERENCE TO RELATED APPLICATIONS

This application is a continuation application of International Application No. PCT/JP2015/068493, filed on Jun. 26, 2015, which claims priority to Japanese Patent Application No. 2014-141173, filed on Jul. 9, 2014, the entire contents of which are incorporated by reference herein.

BACKGROUND

1. Technical Field

The present disclosure relates to a bearing structure in which a shaft is supported by a semi-floating metal bearing, and to a turbocharger.

2. Description of the Related Art

Heretofore, there is known a turbocharger in which a shaft is supported rotatably by a bearing housing and the shaft is provided with a turbine wheel at one end of the shaft and a compressor wheel at the other end of the shaft. Such turbocharger is connected to an engine, and the turbine wheel is rotated by exhaust gas discharged from the engine, and the compressor wheel is rotated by the rotation of the turbine wheel via the shaft. In this way, the turbocharger compresses air with the rotation of the compressor wheel and sends the air to the engine.

A turbocharger described in Japanese Patent Application Laid-Open Publication (Translation of PCT Application) No. 2013-541676 (Patent Literature 1) includes a bearing housing, a bearing holder accommodated in a through-hole of the bearing housing, and a semi-floating metal bearing accommodated in the bearing holder. The semi-floating metal bearing is a kind of bearings, and has a through-hole into which a shaft is inserted. On an inner circumferential surface of the through-hole of the semi-floating metal bearing, a bearing surface that receives a radial load of the shaft is formed. Note that, in the case of the semi-floating metal bearing in Patent Literature 1, movement in the axial direction and rotating direction of the shaft is regulated. Further, the bearing holder has a press-fit portion to be press-fitted into the through-hole of the bearing housing, on both end sides of the shaft in the axial direction.

SUMMARY

In the turbocharger in Patent Literature 1, the press-fit portion of the bearing holder contacts to the bearing housing. Accordingly, heat in the bearing housing is transmitted to the bearing surface of the semi-floating metal bearing via the press-fit portion. Consequently, the temperature of lubricating oil may rise to thereby deteriorate bearing performance. Further, in the operation of the turbocharger, vibration going with the rotation of the shaft is propagated to the bearing housing, and, therefore, suppression of vibration as the whole turbocharger is desired.

It is an object of the present disclosure to provide a bearing structure and a turbocharger capable of improving bearing performance and reducing vibration.

A first aspect of the present disclosure is a bearing structure, including a through-hole formed in a bearing housing accommodating a shaft, the through-hole penetrating in an axial direction of the shaft, the shaft being provided with a turbine wheel at one end of the shaft and a compressor wheel at the other end of the shaft; a bearing holder being an annular-shaped member accommodated in the through-hole; a semi-floating metal bearing being an annular-shaped member accommodated in the bearing holder, the bearing supporting the shaft inserted thereinto; and a positioning member inserted into both the bearing holder and the semi-floating metal bearing in a radial direction of the shaft, and the positioning member regulating movement of the semi-floating metal bearing in a rotating direction of the shaft relative to the bearing holder, wherein the bearing holder includes a press-fit portion to be press-fitted into the through-hole, and a gap is formed between at least one of outer circumferential surfaces of both end parts of the bearing holder in the axial direction and an inner circumferential surface of the through-hole.

The press-fit portion may be formed in the bearing holder, and may be located on one of a turbine wheel side and a compressor wheel side than a center position of the bearing holder in the axial direction, and the gap may be formed in an outer circumferential surface of the bearing holder and may be located on the other of the turbine wheel side and the compressor wheel side than the center position.

The bearing holder may include: a main body formed into an annular shape; a turbine-side projection formed in an outer circumferential surface of the main body, located on the turbine wheel side than the center position, the turbine-side projection extending in a circumferential direction of the main body; a compressor-side projection formed in an outer circumferential surface of the main body, located on the compressor wheel side than the center position, the compressor-side projection extending in the circumferential direction of the main body; and an oil supply hole opened between the turbine-side projection and the compressor-side projection in the outer circumferential surface of the main body to guide a lubricating oil to an inside of the main body; wherein the press-fit portion is formed from one of the turbine-side projection or the compressor-side projection and the gap is formed between the other of the turbine-side projection or the compressor-side projection and an inner circumferential surface of the through-hole.

An outer diameter of the turbine-side projection may be equal to or less than the minimum inner diameter of the through-hole on the compressor wheel side than the turbine-side projection, and the bearing holder may be inserted into the through-hole from the compressor wheel side.

The press-fit portion may be formed on the turbine wheel side than the center position.

The press-fit portion may be formed on the compressor wheel side than the center position.

A second aspect of the present disclosure is a turbocharger, which includes the bearing structure according to the first aspect.

According to the present disclosure, it possible to improve bearing performance and reduce vibration.

DESCRIPTION OF THE EMBODIMENTS

Hereinafter, an embodiment of the present disclosure will be explained in detail with reference to the attached drawings. Dimensions, materials, concrete numerical values etc. shown in such embodiment are nothing but exemplifications for making understanding of the disclosure easy, and do not limit the present disclosure unless otherwise noted in particular. Note that, in the description and drawings, to components having substantially the same function or configuration, the same sign is attached and repeated explanation is omitted, and diagrammatic representation of components having no direct relationship to the present disclosure is omitted.

Figure 1:
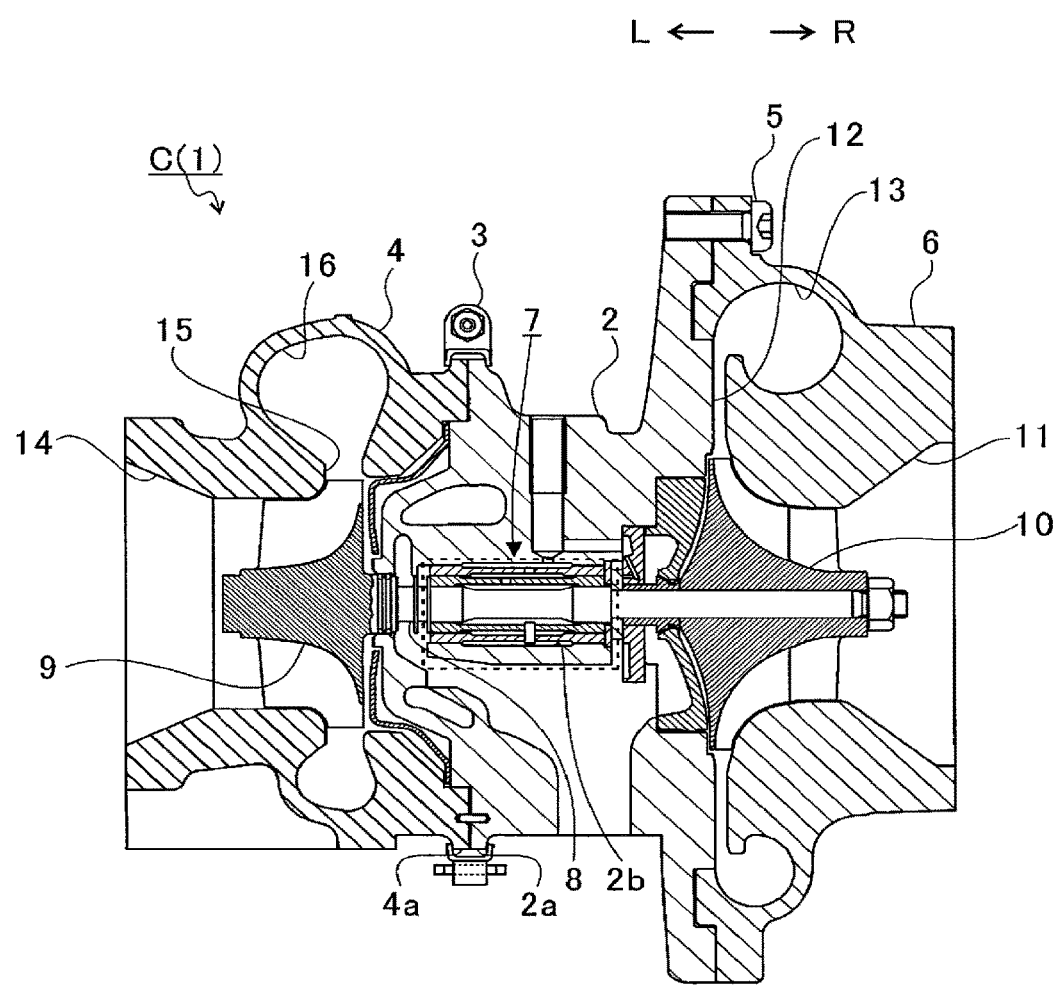
FIG. 1 is a schematic cross-sectional view of a turbocharger according to an embodiment of the present disclosure.

FIG. 1 is a schematic cross-sectional view of a turbocharger C. In what follows, explanation will be given with a definition that an arrow L shown in FIG. 1 shows the direction of the left side of the turbocharger C, and that an arrow R shows the direction of the right side of the turbocharger C. As shown in FIG. 1, the turbocharger C includes a turbocharger main body 1. The turbocharger main body 1 has a bearing housing 2, a turbine housing 4 coupled to the left side of the bearing housing 2 with a fastening mechanism 3, and a compressor housing 6 coupled to the right side of the bearing housing 2 with a fastening bolt 5. These are integrated.

A projection 2a is provided for the outer circumferential surface near the turbine housing 4 of the bearing housing 2. The projection 2a projects in the radial direction of the bearing housing 2. Further, a projection 4a is provided for the outer circumferential surface near the bearing housing 2 of the turbine housing 4. The projection 4a projects in the radial direction of the turbine housing 4. The bearing housing 2 and the turbine housing 4 are fixed to one another by band-fastening of the projections 2a and 4a with the fastening mechanism 3. The fastening mechanism 3 is configured from a fastening band (such as G coupling) sandwiching the projections 2a and 4a.

A bearing structure 7 is provided for the bearing housing 2. Specifically, a through-hole 2b penetrating through in the left and right direction of the turbocharger C (the axial direction of a shaft 8) is formed in the bearing housing 2, and the shaft 8 is supported rotatably in the through-hole 2b. The bearing structure 7 will be described in detail later.

A turbine wheel 9 is fixed integrally to the left end part (one end, a first end part) of the shaft 8, and the turbine wheel 9 is accommodated rotatably in the turbine housing 4. Further, a compressor wheel 10 is fixed integrally to the right end part (the other end, a second end part) of the shaft 8, and the compressor wheel 10 is accommodated rotatably in the compressor housing 6.

An intake port 11 is formed in the compressor housing 6. The intake port 11 opens on the right side of the turbocharger C, and is connected to an air cleaner (not illustrated). Further, in a state where the bearing housing 2 and the compressor housing 6 are coupled with the fastening bolt 5, surfaces of both housings 2 and 6 facing each other form a diffuser passage 12 that boosts air pressure. The diffuser passage 12 is formed in an annular shape from the inside toward the outside of the shaft 8 in the radial direction. The diffuser passage 12 is communicated with the intake port 11 via the compressor wheel 10, in the inside of the radial direction.

A compressor scroll passage 13 is provided in the compressor housing 6. The compressor scroll passage 13 is formed in an annular shape, and is located on the outside of the shaft 8 (the compressor wheel 10) in the radial direction of the diffuser passage 12. The compressor scroll passage 13 is communicated with an intake port (not illustrated) of the engine. Further, the compressor scroll passage 13 is also communicated with the diffuser passage 12. Accordingly, when the compressor wheel 10 rotates, the air is sucked into the compressor housing 6 from the intake port 11, is accelerated caused by the operation of centrifugal force while the air flows between blades of the compressor wheel 10, is boosted in pressure in the diffuser passage 12 and the compressor scroll passage 13, and is guided to an intake port of the engine.

A discharge port 14 is formed in the turbine housing 4. The discharge port 14 opens on the left side of the turbocharger C, and is connected to an exhaust gas purification device (not illustrated). A passage 15 and an annular-shaped turbine scroll passage 16 located on the outside of the passage 15 in the radial direction of the shaft 8 (the turbine wheel 9) are provided for the turbine housing 4. The turbine scroll passage 16 is communicated with a gas inflow port (not illustrated) to which exhaust gas discharged from an exhaust manifold (not illustrated) of the engine is guided. Further, the turbine scroll passage 16 is also communicated with the passage 15. Accordingly, the exhaust gas is guided from the gas inflow port to the turbine scroll passage 16, and thus guided to the discharge port 14 via the passage 15 and the turbine wheel 9. In the circulation process, the exhaust gas rotates the turbine wheel 9. The turning force of the turbine wheel 9 is transmitted to the compressor wheel 10 via the shaft 8, thereby rotating the compressor wheel 10. The air is boosted in pressure by the turning force of the compressor wheel 10 and is guided to the intake port of the engine.

Figure 2:
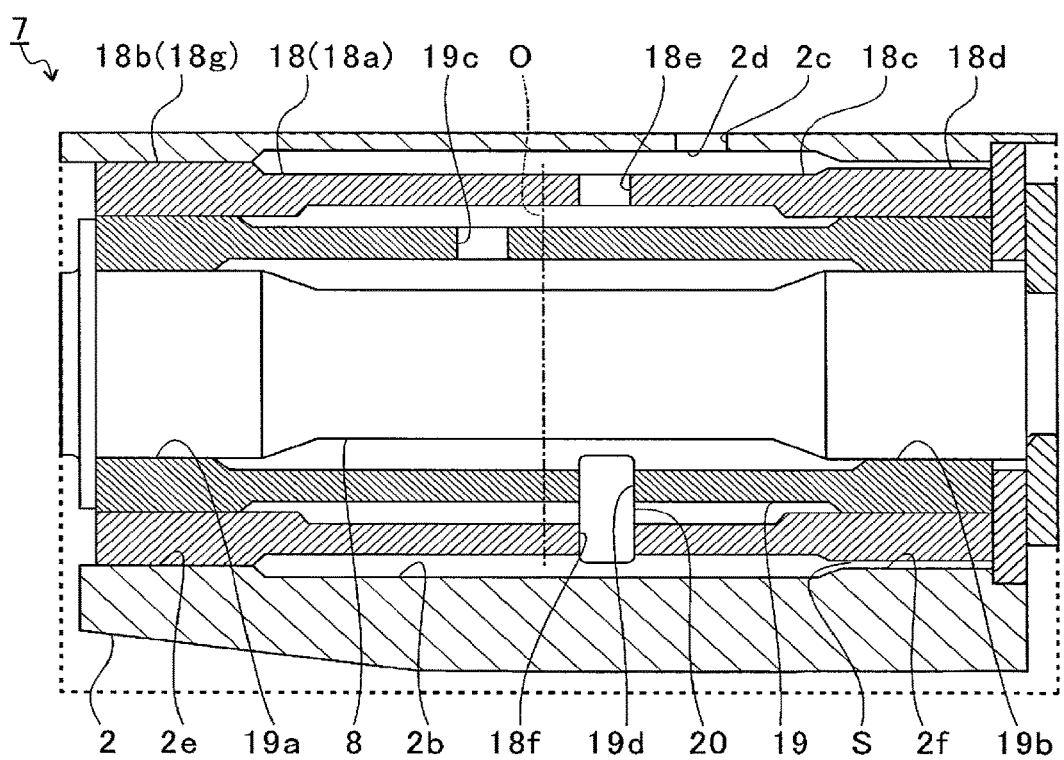
FIG. 2 is a drawing for explaining a bearing structure of the embodiment.

FIG. 2 is a drawing for explaining the bearing structure 7 of the embodiment, which shows the broken line part abstracted from FIG. 1. As shown in FIG. 2, the bearing structure 7 has the through-hole 2b formed in the bearing housing 2 and a bearing holder 18 being an annular-shaped member to be accommodated in the through-hole 2b. The bearing holder 18 has an annular-shaped (tube-shaped) main body 18a.

The main body 18a has a projection 18b on the turbine side. Hereinafter, the projection 18b is called a turbine-side projection. The turbine-side projection 18b is formed in an outer circumferential surface 18c of the main body 18a, and is located on the turbine wheel 9 side (the left side in FIG. 2) than center position O of the bearing holder 18 in the axial direction of the shaft 8. The projection 18b is formed in an annular shape extending in the circumferential direction of the main body 18a, and projects to the outside of the main body 18a in the radial direction. Further, the main body 18a has a projection 18d on the compressor side. Hereinafter, the projection 18d is called a compressor-side projection. The compressor-side projection 18d is formed in the outer circumferential surface 18c of the main body 18a, and is located on the compressor wheel 10 side than the center position O. The compressor-side projection 18d is formed in an annular shape extending in the circumferential direction of the main body 18a, and projects to the outside in the radial direction of the main body 18a.

In the outer circumferential surface of the main body 18a, an oil supply hole 18e is formed between the turbine-side projection 18b and the compressor-side projection 18d. The oil supply hole 18e penetrates through the main body 18a in the radial direction, and guides a lubricating oil to the inside of the main body 18a.

An oil path 2c is formed in the bearing housing 2. The oil path 2c is communicated from the outside of the bearing housing 2 to the through-hole 2b. The oil path 2c guides lubricating oil from the outside of the bearing housing 2 to the through-hole 2b. The oil path 2c has an opening 2d on the through-hole 2b side. The opening 2d faces a part between the turbine-side projection 18b and the compressor-side projection 18d in the outer circumferential surface 18c of the bearing holder 18.

Further, in the inside of the main body 18a of the bearing holder 18, a semi-floating metal bearing 19 is accommodated. The semi-floating metal bearing 19 is an annular-shaped member, and the shaft 8 is inserted into the inside of the semi-floating metal bearing 19. Bearing surfaces 19a and 19b are formed in the inner circumferential surface of the semi-floating metal bearing 19. The bearing surfaces 19a and 19b lie on both end sides of the shaft 8 in the axial direction, respectively.

An oil hole 19c opens between both bearing surfaces 19a and 19b in the inner circumferential surface of the semi-floating metal bearing 19. The oil hole 19c penetrates through the semi-floating metal bearing 19 in the radial direction, and guides lubricating oil to the inside of the semi-floating metal bearing 19.

The lubricating oil is guided to the through-hole 2b through the oil path 2c, is stored temporarily between the turbine-side projection 18b and the compressor-side projection 18d, and is guided to the inside of the main body 18a via the oil supply hole 18e of the bearing holder 18. A part of the lubricating oil guided to the inside of the main body 18a is supplied to the outer circumferential surface of the semi-floating metal bearing 19, and functions as an oil damper for suppressing vibration of the semi-floating metal bearing 19.

Further, a part of the lubricating oil guided to the inside of the main body 18a is guided to the inside of the semi-floating metal bearing 19 via the oil hole 19c of the semi-floating metal bearing 19, and is supplied to the bearing surfaces 19a and 19b. The bearing surfaces 19a and 19b form a film of the lubricating oil relative to the outer circumferential surface of the shaft 8, and support the shaft 8 rotatably by the oil film pressure.

A hole 18f is formed in the bearing holder 18. The hole 18f penetrates through the bearing holder 18 in the radial direction. A hole 19d is formed in the semi-floating metal bearing 19. The hole 19d penetrates through the semi-floating metal bearing 19 in the radial direction. The hole 18f and the hole 19d lie in positions facing each other in the radial direction. A positioning member 20 is inserted to both holes 18f and 19d in the radial direction of the shaft 8. The positioning member 20 is configured, for example, from a pin etc., and regulates movement of the semi-floating metal bearing 19 in the axial direction and rotating direction of the shaft 8 relative to the bearing holder 18. Here, a case where the positioning member 20 is configured from a pin is explained, but the positioning member 20 is not limited to a pin but may be a member of another shape.

In the present embodiment, the bearing holder 18 is provided, and the positioning member 20 regulates the movement of the semi-floating metal bearing 19 relative to the bearing holder 18. Accordingly, the positioning member 20 can be inserted into the holes 18f and 19d prior to accommodate the bearing holder 18 and the semi-floating metal bearing 19 in the through-hole 2b, and, therefore, an installation operation of the positioning member 20 becomes easy.

The bearing holder 18 has a press-fit portion 18g to be press-fitted into the through-hole 2b. The press-fit portion 18g is formed in the turbine-side projection 18b. The press-fit portion 18g has an outer diameter before pressure insertion that is slightly larger than an inner diameter of a site 2e of the through-hole 2h facing the turbine-side projection 18b.

Further, a gap S is formed on the compressor wheel 10 side (the right side in FIG. 2) of the outer circumferential surface 18c in the bearing holder 18 in the axial direction of the shaft 8, more strictly between the compressor-side projection 18d and the inner circumferential surface of the through-hole 2b.

In this way, in the embodiment, the gap S is formed between the compressor-side projection 18d and the inner circumferential surface of the through-hole 2b, and the bearing holder 18 is pressure-fitted and fixed in the through-hole 2b with the turbine-side projection 18b alone. Accordingly, it is possible to reduce the contact area between the bearing holder 18 and the bearing housing 2, and to suppress the heat to be transmitted to the semi-floating metal bearing 19 from the bearing housing 2 via the bearing holder 18. Further, as a result of reducing the contact area between the bearing holder 18 and the bearing housing 2, it is possible to suppress propagation of the vibration along with the rotation of the shaft 8 to the bearing housing 2.

The press-fit portion 18g is formed in the bearing holder 18, and is located on the turbine wheel 9 side than the center position O in the axial direction. The gap S is formed in the outer circumferential surface 18c of the bearing holder 18, and is located on the compressor wheel 10 side than the center position O.

When comparing the turbine wheel 9 side of the shaft 8 with the compressor wheel 10 side of the shaft 8, the compressor wheel 10 side suffers larger vibration along with the rotation of the shaft 8, and, the compressor wheel 10 side of the shaft 8 whirls around more largely as compared with the turbine wheel 9 side of the shaft 8. Here, by forming the press-fit portion 18g on the turbine wheel 9 side than the center position O and by forming the gap S on the compressor wheel 10 side than the center position O, it is possible to suppress furthermore the transmission of the vibration along with the rotation of the shaft 8 to the bearing housing 2 via the bearing holder 18.

The bearing holder 18 may be inserted into the through-hole 2b from either of the turbine wheel 9 side or the compressor wheel 10 side. However, in order to insert the holder from the turbine wheel 9 side, an inner diameter of a site through which a coupled part of the turbine wheel 9 and the shaft 8 is inserted is necessarily made not less than the outer diameter of the bearing holder 18. However, since exhaust gas of high pressure is guided to the turbine wheel 9 side, leak may be generated when the site is made large, which is not so preferable. In the embodiment, the bearing holder 18 is inserted into the through-hole 2b from the compressor wheel 10 side (the right side in FIG. 2) of the through-hole 2b.

Accordingly, the outer diameter of the turbine-side projection 18b is set to be equal to or less than the minimum inner diameter of the through-hole 2b, the diameter becoming the minimum on the compressor wheel 10 side of the turbine-side projection 18b. Here, the minimum inner diameter is the inner diameter of a site 2f facing the compressor-side projection 18d of the through-hole 2b, and the inner diameter of the site 2f is larger than the inner diameter of the site 2e facing the turbine-side projection 18b.

As the result, the turbine-side projection 18b can be inserted into the through-hole 2b until it abuts on the site 2e of the through-hole 2b facing the turbine-side projection 18b without abutting on another site. Consequently, a press fitting operation of the bearing holder 18 into the through-hole 2b becomes easy.

Figure 3A:
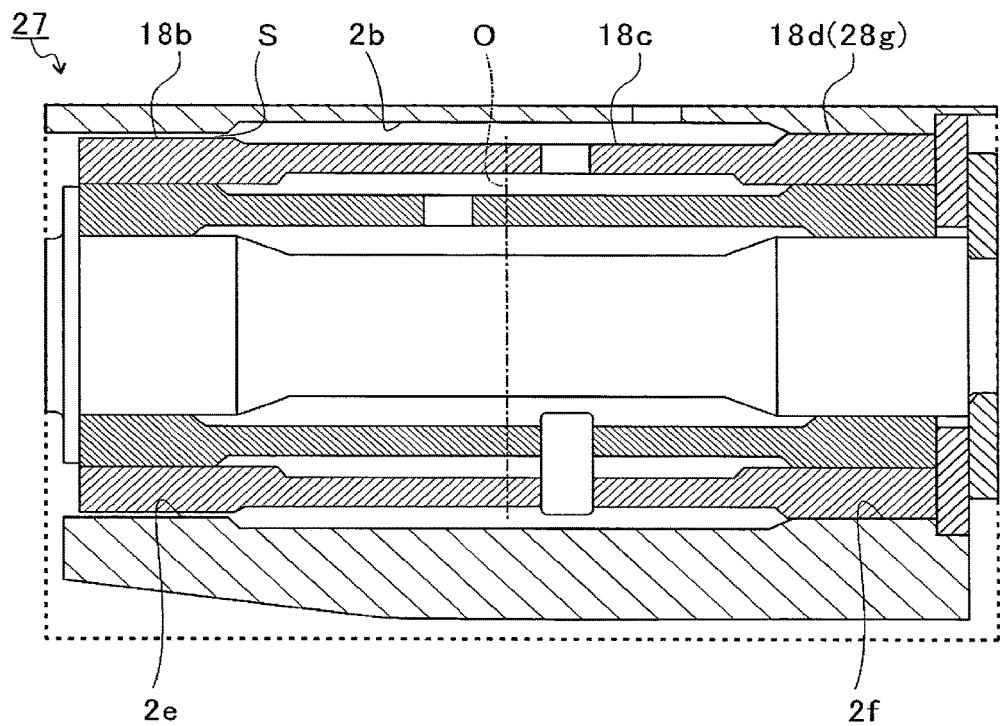
FIG. 3A and FIG. 3B are drawings for explaining bearing structures of modified examples.
Figure 3B:
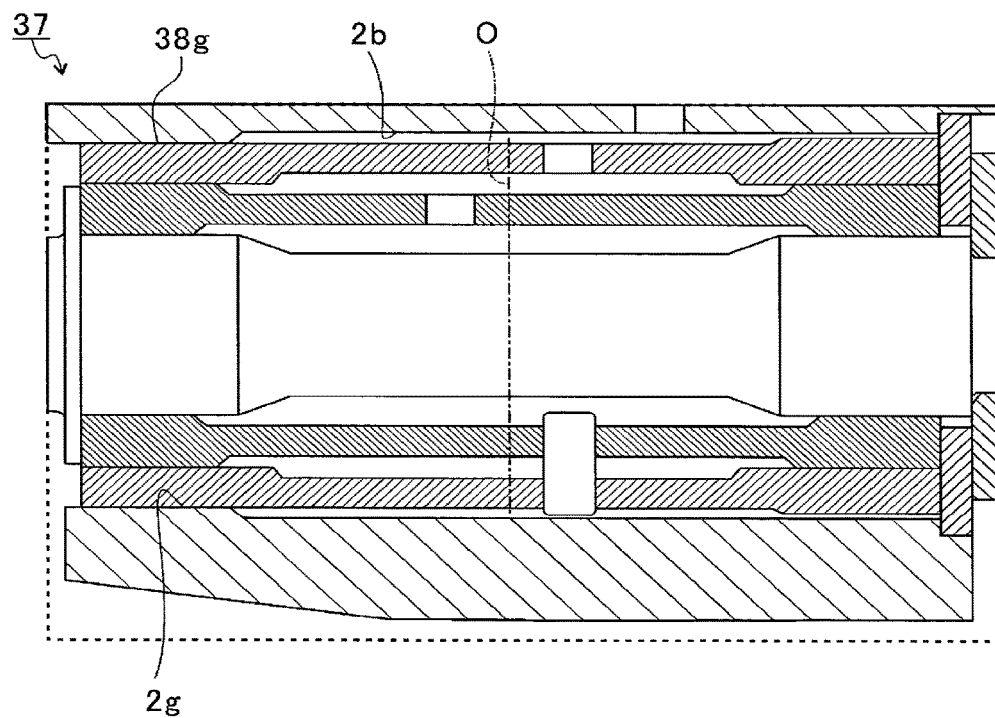

FIG. 3A and FIG. 3B are drawings for explaining bearing structures 27 and 37 of modified examples. FIG. 3A shows a cross-section of a site corresponding to FIG. 2 in the bearing structure 27 of a first modified example. FIG. 3B shows a cross-section of a site corresponding to FIG. 2 in the bearing structure 37 of a second modified example.

As shown in FIG. 3A, in the bearing structure 27 of the first modified example, the bearing holder 18 has a press-fit portion 28g formed on the compressor wheel 10 side (the right side in FIG. 3A) than the center position O. Further, the gap S is formed on the turbine wheel 9 side than the center position O in the outer circumferential surface 18c of the bearing holder 18.

In detail, the press-fit portion 28g is formed in the compressor-side projection 18d. The press-fit portion 28g has an outer diameter before pressure insertion that is slightly larger than the inner diameter of the site 2f of the through-hole 2b facing the compressor-side projection 18d. Further, the gap S is formed between the turbine-side projection 18b and the inner circumferential surface of the through-hole 2b.

When comparing the turbine wheel 9 side of the bearing housing 2 with the compressor wheel 10 side of the bearing housing 2, the turbine wheel 9 side suffers higher temperature. Here, it is possible to suppress furthermore heat to be transmitted to the semi-floating metal bearing 19 from the bearing housing 2 via the bearing holder 18 by forming the press-fit portion 28g on the compressor wheel 10 side than the center position O and forming the gap S on the turbine wheel 9 side than the center position O.

As shown in FIG. 3B, in the bearing structure 37 of the second modified example, the turbine-side projection 18b is not formed. Instead, the inner circumferential surface of the through-hole 2b has an annular-shaped projection 2g on the turbine wheel 9 side (the left side in FIG. 3B).

In the bearing structure 37 of the second modified example, the bearing holder 18 has a press-fit portion 38g formed as a site facing the inside of the annular-shaped projection 2g in a radial direction in the outer circumferential surface 18c. The press-fit portion 38g is formed so that the outer diameter of the press-fit portion 38g before pressure insertion is larger than the inner diameter of the annular-shaped projection 2g. In this way, even when a projection is not provided for the outer circumferential surface 18c on the bearing holder 18 side, the bearing holder 18 may be press-fitted into the through-hole 2b by providing the annular-shaped projection 2g for the inner circumferential surface of the through-hole 2b.

In the above-described embodiment and modified examples, the press-fit portions 18g, 28g, and 38g are formed on either one of the turbine wheel 9 side or the compressor wheel 10 side than the center position O, and the gap S is formed on the other one side. However, the press-fit portions 18g, 28g, and 38g may be continuously formed across the center position O.

Further, in the above-described embodiment and the first modified example, the turbine-side projection 18b and the compressor-side projection 18d are formed. However, as in the second modified example, the turbine-side projection 18b may be not provided, or the turbine-side projection 18b is provided and the compressor-side projection 18d may be not provided. Further, the turbine-side projection 18b and the compressor-side projection 18d may not be provided. In these cases, the formation of an annular-shaped projection in the through-hole 2b results in the formation of the press-fit portions 18g, 28g, and 38g. However, the formation of the turbine-side projection 18b or the compressor-side projection 18d makes it possible to adjust the outer diameter of the turbine-side projection 18b or the compressor-side projection 18d and to form easily the gap S.

Furthermore, in the above-described embodiment and modified examples, the outer diameter of the turbine-side projection 18b is equal to or less than minimum inner diameter of the through-hole 2b, the diameter becoming the minimum on the compressor wheel 10 side of the turbine-side projection 18b. However, the outer diameter of the turbine-side projection 18b may be larger than the minimum inner diameter and pressure insertion places of the turbine-side projection 18b may be more than one.

Moreover, in the above-described embodiment, a thrust bearing is provided as a member separated from the semi-floating metal bearing 19. However, a thrust bearing may be provided integrally for an end surface of the semi-floating metal bearing 19.

In addition, in the above-described embodiment, the positioning member 20 regulates movement of the semi-floating metal bearing 19 in the axial direction and rotating direction relative to the bearing holder 18. However, the positioning member 20 may not regulate the movement in the axial direction. Here, suppression of contact of the semi-floating metal bearing 19 to a surrounding member such as a thrust bearing becomes possible by regulating the movement in the axial direction. Further, when providing integrally a thrust bearing for an end surface of the semi-floating metal bearing 19, regulation in the axial direction is preferable.

Additionally, in the above-described embodiment, a lubricating oil is guided to the inside of the main body 18a via the oil path 2c and the oil supply hole 18e of the bearing holder 18. However, the oil path 2c may be branched so that the lubricating oil is directly guided to the turbine wheel 9 side and the compressor wheel 10 side of the semi-floating metal bearing 19. In this case, the oil supply hole 18e and the oil hole 19c may be provided, respectively, near the opening part of the turbine wheel 9 side and the opening part of the compressor wheel 10 side of the branched oil path 2c. Further, on the inner circumferential surface of bearing surfaces 19a and 19b, for example, a groove extending in the axial direction or radial direction of the shaft 8 may be formed.

Hereinabove, the embodiment of the present disclosure is explained with reference to the attached drawings, but, needless to say, the present disclosure is not limited to the embodiment. Obviously a person skilled in the art may conceive various alteration examples or correction examples in the category described in the claims, and it is understood that these belong to the technical scope of the present disclosure as a matter of course.

What is claimed is:

1. A bearing structure, comprising:
a through-hole formed in a bearing housing accommodating a shaft, the through-hole penetrating in an axial direction of the shaft, the shaft being provided with a turbine wheel at one end of the shaft and a compressor wheel at the other end of the shaft;
a bearing holder being an annular-shaped member accommodated in the through-hole;
a semi-floating metal bearing being an annular-shaped member accommodated in the bearing holder, the bearing supporting the shaft inserted thereinto; and
a positioning member inserted into both the bearing holder and the semi-floating metal bearing in a radial direction of the shaft, and the positioning member regulating movement of the semi-floating metal bearing in a rotating direction of the shaft relative to the bearing holder, wherein
the bearing holder includes a press-fit portion provided only on a first end in the axial direction to be press-fitted into the through-hole, and
a gap is formed on a second end of the bearing holder in the axial direction between an outer circumferential surface of the second end and an inner circumferential surface of the through-hole.

2. The bearing structure according to claim 1, wherein the press-fit portion is formed on the bearing holder, and is located closer to one of a turbine wheel side and a compressor wheel side than a center position of the bearing holder in the axial direction, and the gap is formed in an outer circumferential surface of the bearing holder and is located closer to the other of the turbine wheel side and the compressor wheel side than the center position.

3. The bearing structure according to claim 2, wherein the bearing holder includes:
a main body formed into an annular shape;
a turbine-side projection formed in an outer circumferential surface of the main body, located closer to the turbine wheel side than the center position, the turbine-side projection extending in a circumferential direction of the main body;
a compressor-side projection formed in an outer circumferential surface of the main body, located closer to the compressor wheel side than the center position, the compressor-side projection extending in the circumferential direction of the main body; and
an oil supply hole opened between the turbine-side projection and the compressor-side projection in the outer circumferential surface of the main body to guide a lubricating oil to an inside of the main body;
wherein the press-fit portion is formed from one of the turbine-side projection or the compressor-side projection and the gap is formed between the other of the turbine-side projection or the compressor-side projection and the inner circumferential surface of the through-hole.

4. The bearing structure according to claim 3, wherein an outer diameter of the turbine-side projection is equal to or less than the minimum inner diameter of the through-hole on the compressor wheel side than the turbine-side projection, and the bearing holder is inserted into the through-hole from the compressor wheel side.

5. The bearing structure according to claim 4, wherein the press-fit portion is formed closer to the turbine wheel side than the center position.

6. The bearing structure according to claim 4, wherein the press-fit portion is formed closer to the compressor wheel side than the center position.

7. The bearing structure according to claim 3, wherein the press-fit portion is formed closer to the turbine wheel side than the center position.

8. The bearing structure according to claim 3, wherein the press-fit portion is formed closer to the compressor wheel side than the center position.

9. The bearing structure according to claim 2, wherein the press-fit portion is formed closer to the turbine wheel side than the center position.

10. The bearing structure according to claim 2, wherein the press-fit portion is formed closer to the compressor wheel side than the center position.

11. A turbocharger comprising the bearing structure according to claim 1.

\* \* \* \* \*